United States Patent [19]

Rau

[11] Patent Number: 4,842,839
[45] Date of Patent: Jun. 27, 1989

[54] PROCESS FOR THE REMOVAL OF HYDROGEN FROM HYDROGEN COMPOUNDS DISSOLVED IN SILICON TETRACHLORIDE OR GERMANIUM TETRACHLORIDE

[75] Inventor: Hans Rau, Aachen, Fed. Rep. of Germany

[73] Assignee: U.S. Philips Corporation, New York, N.Y.

[21] Appl. No.: 211,085

[22] Filed: Jun. 21, 1988

Related U.S. Application Data

[63] Continuation of Ser. No. 53,603, May 20, 1987, abandoned.

[30] Foreign Application Priority Data

Jan. 25, 1985 [DE] Fed. Rep. of Germany ....... 3502367

[51] Int. Cl.⁴ .................... C01B 33/107; C01G 17/04
[52] U.S. Cl. .................................... 423/342; 423/494
[58] Field of Search .................. 423/341, 342, 494

[56] References Cited

U.S. PATENT DOCUMENTS

| 3,754,077 | 8/1973 | Kruger et al. | 423/341 |
| 3,790,459 | 2/1974 | Kotzsch et al. | 423/342 |
| 4,310,341 | 1/1982 | Barns et al. | 210/754 |

FOREIGN PATENT DOCUMENTS 2805824  8/1978  Fed. Rep. of Germany ...... 423/242

OTHER PUBLICATIONS

Chemistry, Bailar, Jr. et al. Academic Press, 1978, p. 419.
The Solubility of HCl in SiCl$_y$; Rav. J. Chem. Thermodynamics, vol. 14, pp. 77–82 (1982).

Primary Examiner—John Doll
Assistant Examiner—Jeffrey Edwin Russel
Attorney, Agent, or Firm—Norman N. Spain

[57] ABSTRACT

By a chlorination process at a temperature exceeding 1000° C. all hydrogenous compounds, including organic compounds, are converted into hydrogen-free compounds, e.g. CCl$_4$, which do not interfere in the manufacture of optical fibres.

1 Claim, 1 Drawing Sheet

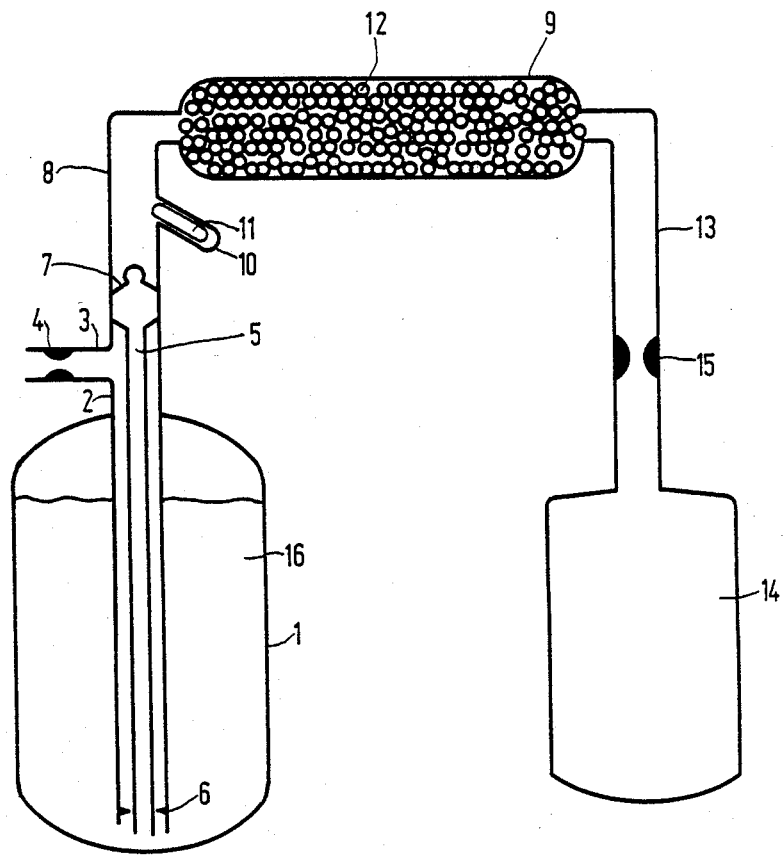

PROCESS FOR THE REMOVAL OF HYDROGEN FROM HYDROGEN COMPOUNDS DISSOLVED IN SILICON TETRACHLORIDE OR GERMANIUM TETRACHLORIDE

This is a continuation of application Ser. No. 053,603, filed May 20, 1987, now abandoned.

BACKGROUND OF THE INVENTION

The invention relates to a process for the removal of hydrogen from hydrogen compounds dissolved in silicon tetrachloride or germanium tetrachloride by chlorination of the hydrogen compounds.

In the production of optical fibres for transmission of information on a basis of $SiO_2/GeO_2$ glass, OH-impurities play an important part because of their optical absorption. For high-quality fibres these impurities have to be reduced to a very low level, namely below 0.1 ppm by weight (corresponding approximately to 4.5 dB/km additional attenuation at a light wavelength of 1.38 μm).

The chief sources of OH-impurities in optical fibres are hydrogen comprising impurities in the starting materials $SiCl_4$ and $GeCl_4$. If, for example, the PCVD process is used for production of the fibres, approximately one-eightieth of the H atoms supplied in the gas flow $(SiCl_4+GeCl_4+O_2)$ are incorporated into the glass as OH-groups (M. Lennartz, H. Rau, Betty Trafford, J. Ungelenk; ECOC 83-9th European Conference on Optical Communication (1983) 21-24). Total removal of such hydrogen impurities from the starting material is thus a technically important necessity.

It is known from (German patent) DE-AS No. 12 63 730 that germanium tetrachloride can be purified with hydrochloric acid and chlorine. In this process arsenic and other similar impurities are removed.

According to DE-AS No. 19 48 911 spontaneously or readily flammable hydrogen silanes can be removed from trichlorosilane, silicon tetrachloride or mixtures of these by adding anhydrous chlorine at a temperature in the range from −30° to +300° C. in a quantity corresponding to one to two times the quantity which is stoichiometrically required for conversion of the silicon-hydrogen bond to be chlorinated. The reaction also occurs in the desired manner, below and above that temperature range, either in the dark or during exposure to illumination, e.g. with UV light. Light thus has little appreciable effect on the course of the process.

With the process known from DE-AS No. 19 48 911 a selective partial chlorination of hydrogen silanes hydrogenated beyond trichlorosilane is obtained, i.e. trichlorosilane is not chlorinated. This process is therefore unsuitable for removing all the hydrogen from the hydrogenous compounds dissolved in silicon tetrachloride.

It is known from DE-OS No. 28 05 824 how to purify silicon tetrachloride containing as an impurity a silane compound which has in its molecule at least one hydrogen atom bound directly to the silicon atom by irradiating the silicon tetrachloride with UV light in the presence of chlorine. Trichlorosilane is thus also chlorinated in this manner. Removal of the resultant hydrogen chloride presents no problems (H. Rau, J. Chem. Thermodynamics 14 (1982) 77-82). According to DE-OS No. 31 35 916 hydrocarbon compounds and other hydrogen impurities are also removed by the ultraviolet chlorination method known from DE-OS No. 28 05 824. Impurities of this kind can find their way into the silicon tetrachloride in the course of previous purification measures. Thus it is known from, for example, DE-PS No. 867 544 that liquid chlorides of elements in group 4 of the periodic table can be purified with the aid of organic compounds, e.g. alcohols.

In the course of the research which led to the invention, however, it was established that the reaction with chlorine accompanied by UV radiation does not lead in every case to a total removal of hydrogen; for example, ethyl alcohol, $C_2H_5OH$, reacts with chlorine to form chloral (Holleman-Richter, Lehrbuch der organischen Chemie, 37th-41st edition (Berlin 1961), p. 230):

$$C_2H_5OH + 4Cl_2 = CCl_3CHO + 5HCl$$

in which an H atom is left behind.

BRIEF SUMMARY OF THE INVENTION

An object of the present invention is therefore to guarantee the removal of all hydrogen in hydrogen compounds by the conversion of all hydrogen to HCl.

According to the invention this object is achieved by the invention by performing the chlorination at a temperature of at least 1000° C.

The minimum temperature stated above is essential since below 1000° C. the removal of the hydrogen is not complete. Higher temperatures of 1000° C. are of direct benefit because the speed of reaction between chlorine and the hydrogen compounds present increases with temperature, although there is an upper limit determined by the necessary stability of the material of which the reactor and any fillers which it may contain consist. When quartz glass is used, the upper limit is around 1200° C.

According to the invention, therefore, the reaction between hydrogen and chlorine is not enhanced by UV light but proceeds thermally at high temperatures. In this process organic impurities, for example, are totally converted into perchloric compounds, particularly $CCl_4$, $SiHCl_3$ and $GeHCl_3$ are, of course, also totally chlorinated.

BRIEF DESCRIPTION OF THE DRAWING

In the drawing the sole FIGURE is a schematic representation in cross-section of an apparatus for carrying out the method of the invention.

DETAILED DESCRIPTION OF THE INVENTION

The invention will now be described in greater detail with reference to the sole FIGURE in the drawing.

The only FIGURE in the drawing is a schematic representation in cross section of a glass apparatus for performing a thermal chlorination according to the method of the invention.

As shown in the drawing glass apparatus comprises a container 1 fitted with a feed pipe 2. Feed pipe 2 ends in container 1 a short distance from the bottom of the container. Outside container 1 feed pipe 2 is provided with a filler neck 3 in which a sealing point 4 is incorporated. Fitted inside feed pipe 2 is a capillary 5 (inside diameter 0.4 mm) which also ends a short distance from the bottom of the container. Glass points 6, extending from feed pipe 2, touch capillary 5 for the purpose of mechanical stabilisation. Above filler neck 3 the capillary 5 opens into a crush valve 7, from which a pipe 8 leads to a reactor 9. The wall of pipe 8 has a side cavity 10 containing a magnetic body 11 sealed into glass for opening the crush valve 7. The reactor 9 consists of quartz glass and is filled with Raschig rings 12 made of quartz glass. A pipe 13 leads from the reactor to a collecting tank 14. Pipe 13 has a sealing point 15 above the collecting tank 14.

The $SiCl_4$ or $GeCl_4$ containing impurities is led into the evacuated container 1 via the filler neck 3 and pipe 2 and a sufficient quantity of chlorine (e.g. several tenths of mol percent) introduced in the same manner is dissolved in it. Then the filler neck 3 is sealed off and thus closed at 4. The solution is then of a marked yellow-green colour. The part of the apparatus on the far side of crush valve 7 has previously been cleaned, heat-dried in a vacuum and sealed. The reactor 9 is heated to 1000° to about 1100° C. Then the crush valve 7 is opened. Upon increasing the temperature of the $SiCl_4$ or $GeCl_4$ in container 1, the solution of chloride in $SiCl_4$ or $GeCl_4$ begins to rise in capillary 5 because the intrinsic vapour pressure in container 1 is higher than that applying at the condensation point in collecting tank 14, where the temperature has remained unchanged, namely room temperature. The solution 16 is thus led gradually through the reactor where it evaporates completely and where the reaction of the hydrogen containing compounds with chlorine takes place. Use of capillary 5 guarantees a slow even flow of the solution 16 into the reactor 9. The rate of flow is chosen such that the vapour forming from the solution 16 remains in the reactor 9 for several seconds.

At the end of the process the collecting tank 14 is sealed off at 15. The condensate which it contains (not shown in the drawing) can be used without further purification for the production of optical fibres by the PCVD method. The superfluous chlorine dissolved in the condensate will, like the hydrogen chloride formed, be totally removed during the first few coating operations of the PCVD process on account of the higher volatility of these substances. The substances, e.g. $CCl_4$, resulting from chlorination of the impurities are in such small quantities that they are scarcely perceptible.

In the course of one such chlorination, for example, a $SiCl_4$ was obtained with yielded optical fibres with an additional attenuation of only 2.6 dB/km at a light wavelength of 1.38 μm. The starting material before chlorination at 1000° C. gave attenuation values of 17 dB/km at 1.38 μm.

What is claimed is:

1. A process for the removal of all hydrogen from hydrogen compounds dissolved in silicon tetrachloride or germanium tetrachloride comprising chlorinating said hydrogen compounds dissolved in said silicon tetrachloride or germanium tetrachloride with a chlorinating agent essentially consisting of chlorine at a temperature of at least 1000° C.

* * * * *